Dec. 8, 1925.

H. KREISINGER

FUEL DRIER

Filed Oct. 3, 1924

H. KREISINGER

FUEL DRIER

Filed Oct. 3, 1924

INVENTOR
Henry Kreisinger
BY
Synnestvedt & Lechner
ATTORNEYS

Dec. 8, 1925.

H. KREISINGER

FUEL DRIER

Filed Oct. 3, 1924

INVENTOR
Henry Kreisinger
BY
Synnestvedt & Lechner
ATTORNEYS

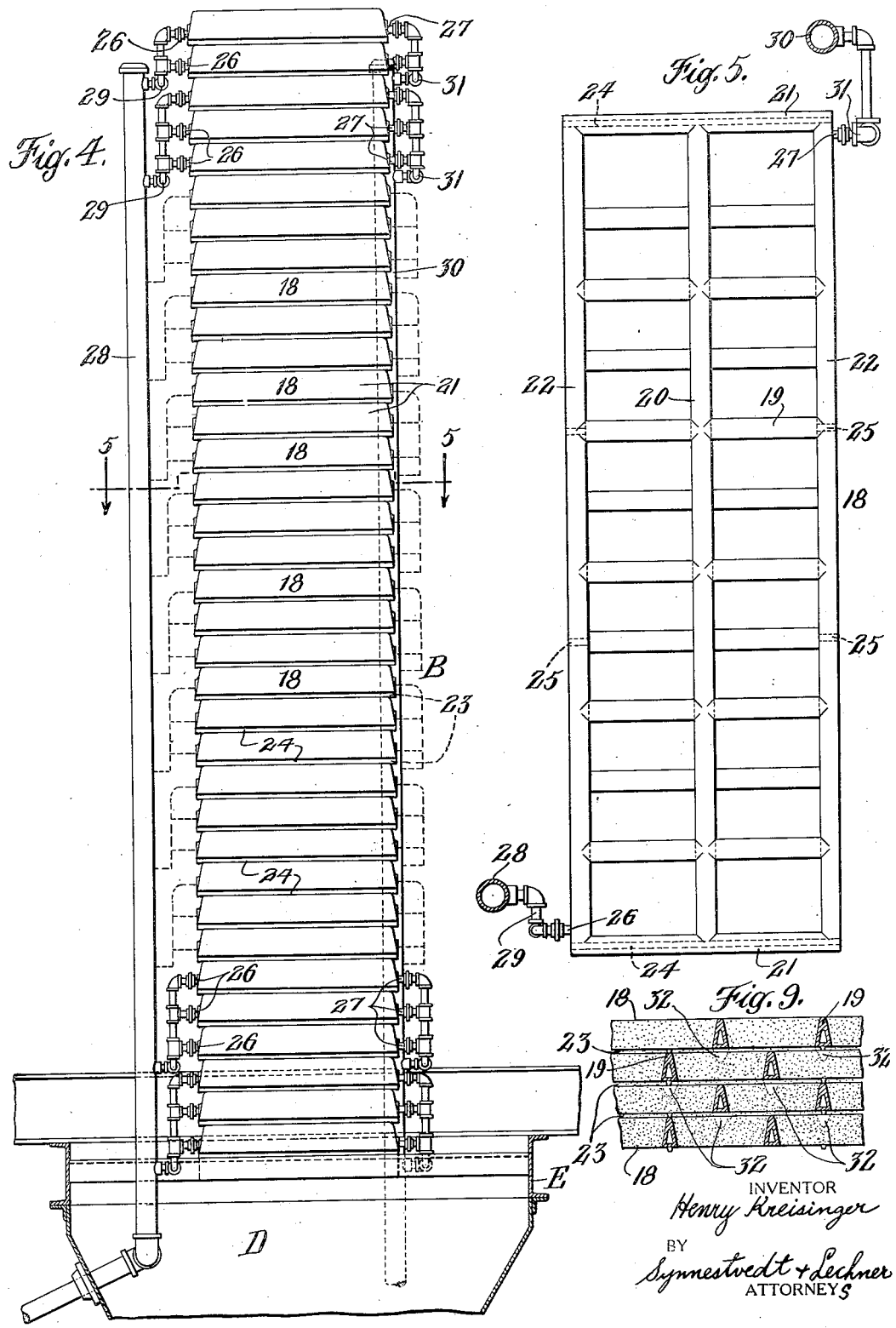

Dec. 8, 1925.
H. KREISINGER
FUEL DRIER
Filed Oct. 3, 1924
1,564,361
5 Sheets-Sheet 5
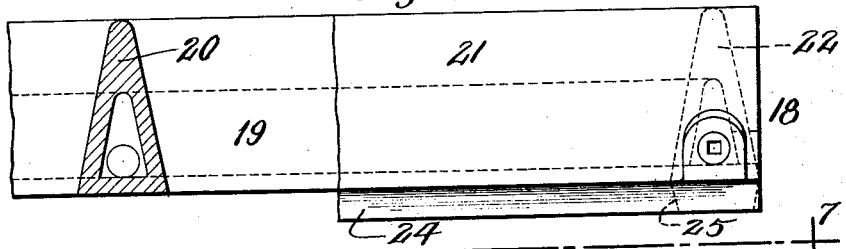
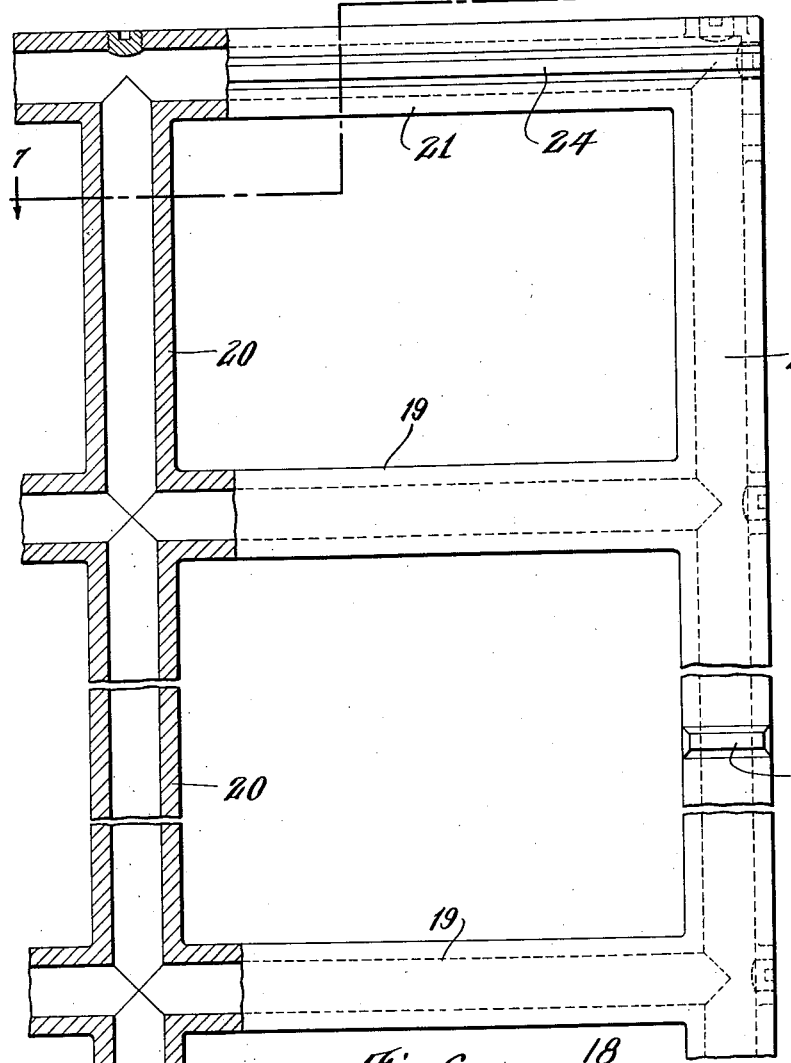
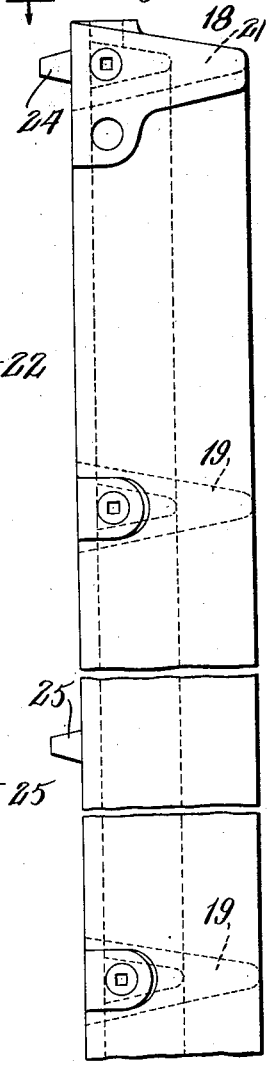
INVENTOR
Henry Kreisinger
BY
Synnestvedt & Lechner
ATTORNEY Patented Dec. 8, 1925.

1,564,361

UNITED STATES PATENT OFFICE.

HENRY KREISINGER, OF PIERMONT, NEW YORK, ASSIGNOR TO COMBUSTION ENGINEERING CORPORATION, OF NEW YORK, N. Y., A CORPORATION OF NEW YORK.

FUEL DRIER.

Application filed October 3, 1924. Serial No. 741,316.

*To all whom it may concern:*

Be it known that I, HENRY KREISINGER, a citizen of the United States, residing at Piermont, in the county of Rockland and State of New York, have invented certain new and useful Improvements in Fuel Driers, of which the following is a specification.

This invention relates to driers and it has for one of its primary objects the provision of an apparatus whereby fuel such as coal for instance may be dried prior to pulverization or in fact for drying it for any particular purpose. It is proposed to dry such fuel by subjecting it to indirect heat and by carrying off therefrom the resulting moisture laden vapors. By utilizing indirect heat for drying the fuel, the heating elements may be made to serve a double purpose, that of drying the fuel and of breaking up the fuel stream so that air or other gases may more readily be passed through for carrying off the moisture in the form of vapor therewith. This prevents the fuel from passing through the drier in close mass formation giving the gases a free passage through the fuel stream and the heater elements.

By the use of indirect heating a heating medium such as steam may be used, means being provided for draining the condensates in the heating members.

Among other objects of this invention is the provision of a heating element made up of a plurality of like members arranged to give the foregoing advantages, such members being simple to manufacture and easy to replace when they become worn.

Still another object of this invention is the provision of a heating element built up of a plurality of superimposed like members to form in itself a conduit for the passing fuel stream, the individual members having freedom for expansion and contraction.

The invention further contemplates an arrangement whereby the heating medium is confined so as to be independent of the moisture carrying off gases, thereby rendering each more effective in its purpose.

How the foregoing together with such other objects and advantages as may hereinafter appear, or are incident to the invention, are obtained, is illustrated in the accompanying drawings in preferred form wherein—

Fig. 4 is an end elevation of Fig. 3 looking toward the left and with the delivery hopper in section.

Fig. 5 is a plan section taken on the line 5—5 of Fig. 4.

Fig. 6 is an enlarged fragmentary view of a corner portion of one of the heating members with a portion thereof shown in section.

Fig. 7 is a section on line 7—7 of Fig. 6.

Fig. 8 is an end view of Fig. 6 looking toward the left and

Fig. 9 is a fragmentary cross section through several heating members showing the voids in the fuel column formed by the bars of the heating members.

Figure 1:
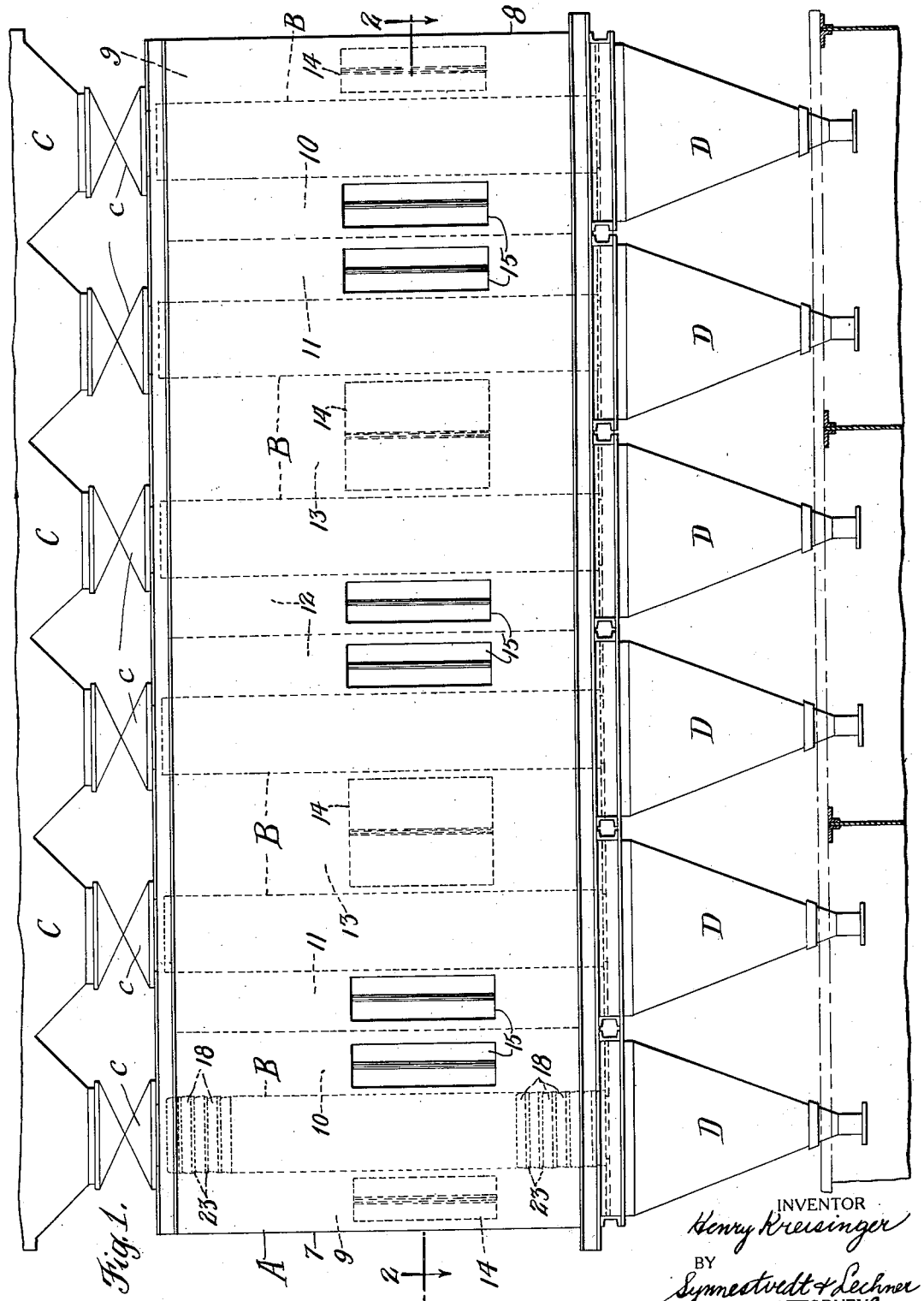
Fig. 1 is a more or less diagrammatic elevation of an apparatus having a plurality of units constructed in accordance with the invention.
Figure 2:
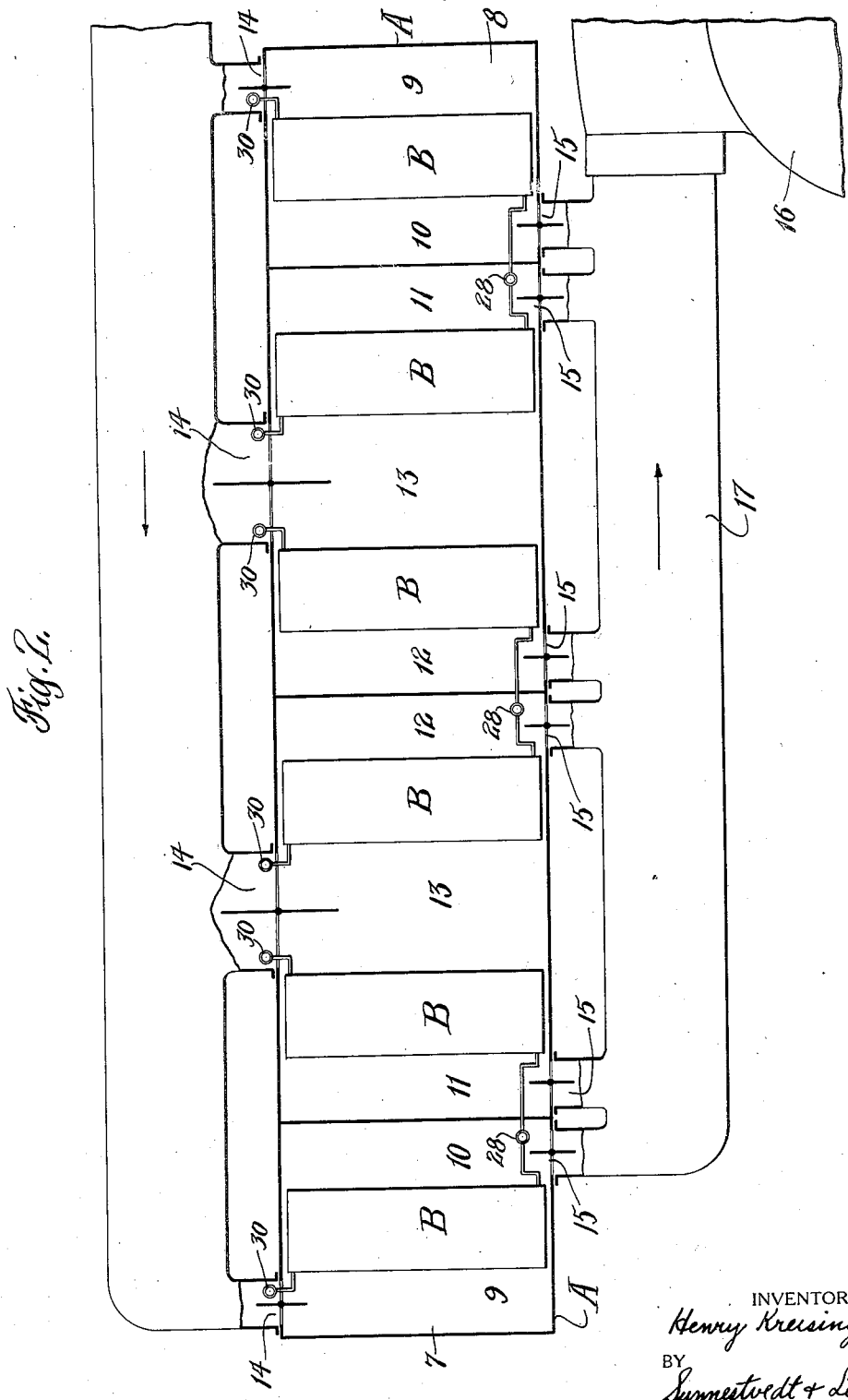
Fig. 2 is a more or less diagrammatic plan section of Fig. 1 taken substantially on the line 2—2 of Fig. 1.

Referring now to Figs. 1 and 2 the reference character A denotes the encasing structure within which are located the heating elements B in the form of conduits. Above each heating element or conduit B is an inlet for the coal to be dried, such coal being previously confined in the bunkers C which are here shown provided with valves $c$ for controlling the flow of the coal, and below each element B is an outlet for the coal through which it is discharged into the delivery hoppers D for delivery to the point of use. If desired, in some instances the bunker and delivery hopper may be dispensed with and the material fed directly into the heating element, the material being taken off directly from said element. In others they may be substituted for by conveyors or other suitable means.

The drier illustrated in Figs. 1 and 2 is composed of a battery of heating devices and shows how a plurality of devices may be used to meet the demands of any particular installation, whether the capacity desired be large or small. The encasing structure A is here shown divided into a group of associated compartments and clearly illustrates how the drier can be extended or contracted to take care of practically any capacity desired.

In the embodiment shown the left and right hand end compartments 7 and 8 are what may be termed single units and are divided into two chambers 9 and 10 by the heating element B, while the intermediate compartments are double units, divided into three chambers 11, 12 and 13 by the two heating elements B therein the central chamber 13 being common to both heating elements. Air or other suitable gas is admitted through damper controlled inlets 14 provided with a manifold to the chambers 9 of the end compartments, and to the central chambers 13 of the intermediate compartments, which air passes through the heating members B and the fuel column passing through said members, into the chambers 10, 11 and 12 from whence it is discharged through damper controlled outlets 15. The air or gas can be caused to flow into and from the encasing structure by means of a suitable blower or exhauster, to which end an exhauster 16 is indicated in the drawings at the end of the discharge manifold 17. The current of air is for the purpose of carrying off moisture in the form of vapor resulting from the drying of the fuel.

Figure 3:
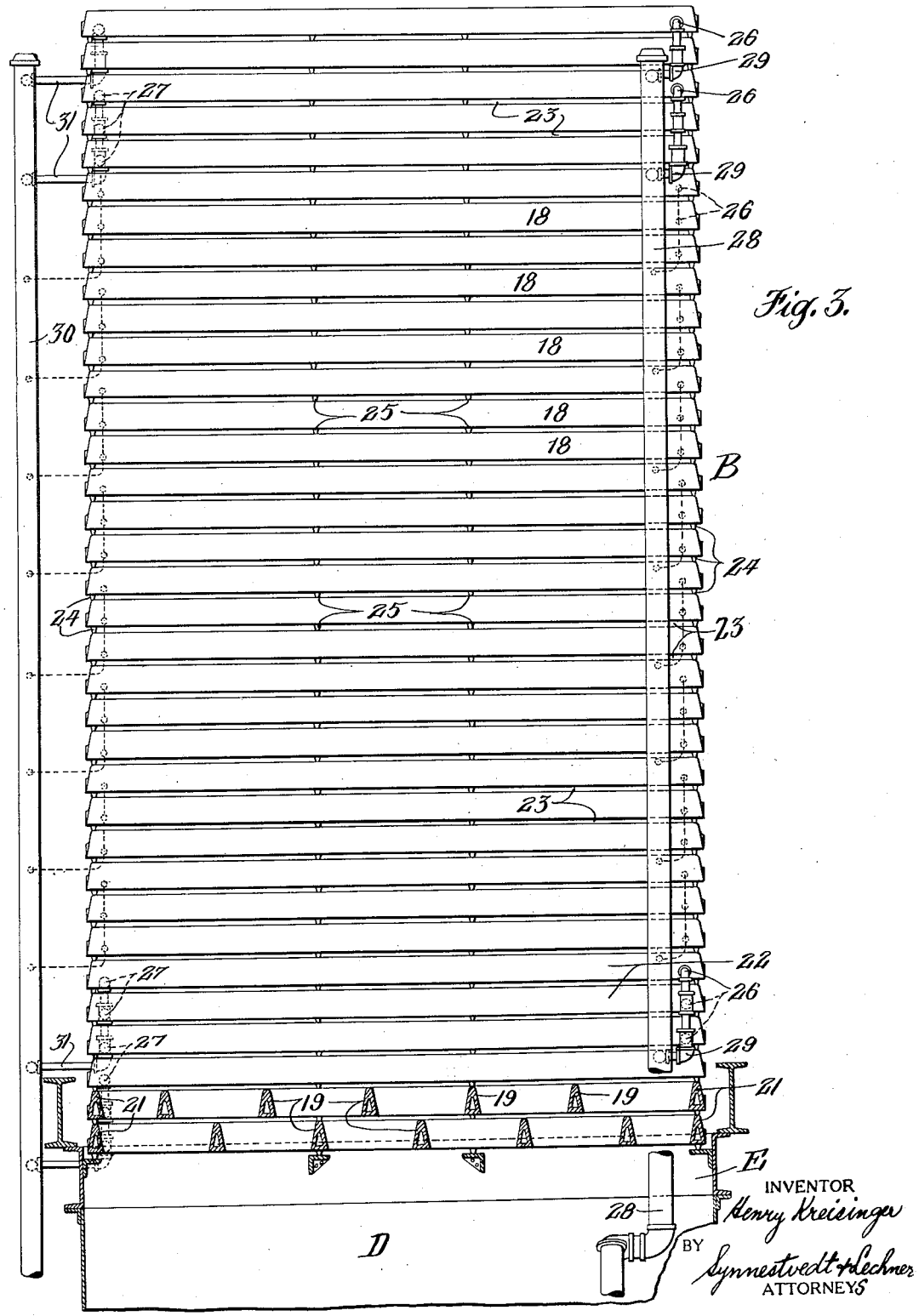
Fig. 3 is an elevation showing an assembled heating element, the lower heating members, the supporting structure and delivery hopper being shown in cross section.

Reverting more especially to Figs. 3, 4 and 5 of the drawings it will be seen that the heating elements B are composed of a plurality of superimposed ring like members such as the hollow grids 18, arranged to form a conduit through which the column of coal to be dried is passed. In other words the grids are stacked one above the other, resting one on the other and the entire group resting upon a frame E around and adjacent to the lower portion of the group.

As best seen in Figs. 3, 5, 7, 8, and 9 these grids 18 are composed of intersecting hollow bars preferably of triangular cross section, which terminate in the hollow end bars 21 and hollow side bars 22, said side and end bars forming a ring. The transverse bars 19 are so spaced that the spaces between the bars are the same, as is the space between the bar at one end and its adjacent end bar 21, the bar at the other end however is spaced from its adjacent end bar 21 a distance equal approximately to a half space. The grids are counterparts which greatly reduces manufacturing cost in that the necessity for stocking a number of different parts going to make up a grid is avoided. They are simple in construction and are preferably cast, in which case a number of openings fitted with plugs are provided at the ends of the bars for the removal of the core material used in casting. It will be observed that when they are stacked one above the other with alternate grids reversed end for end, the bars 19 of each set are immediately above the spaces between the bars 19 of the set immediately below it, this is by virtue of the spacing just described. It will thus be seen that a column of coal in passing through the conduit formed by the stack of grids 18 strikes the staggered bars and is broken up, thus preventing the coal from passing through in close mass formation which would block the current of gas and make for ineffective drying.

The grids 18 are spaced vertically apart so as to provide gaps 23 therebetween, by means of sealing and supporting ribs 24 at the two opposite ends 21 extending the width of the grids and intermediate supporting lugs 25 on the side bars 22. Thus the ribs 24 seal the gaps between the grids at the ends and form transverse passages between grids for the current of air or gas which passes therethrough as and for the purpose hereinbefore described.

A heating medium preferably steam is introduced into the hollow portion of the grid at 27, fills such hollow portion and exits at 26. The steam is introduced at a temperature such that the indirect heat transmitted to the coal is not sufficient to volatilize it but sufficient to drive off the surface moisture and some of the inherent moisture bringing the percentage thereof down. For convenience, and for the purpose of expansion and contraction of the stack of grids, the inlets 27 are connected in groups to a common source 30 for supplying the heating medium, the connection being a swing joint piping connection 31. The outlets 26 are similarly connected to the exhaust pipe 28, by swing joint connections 29.

Referring to Fig. 3 it will be seen that the heating element or stack of grids B is supported at an angle, that is they are slightly sloped towards the exit end, to drain the water of condensation.

In operation of the device as shown coal is fed from the bunkers C by gravity, the feed being controlled by valves c, and passes in a column through the conduit formed by the stack of heating members B, into the delivery hoppers D. In passing through the conduit the coal is subjected to the indirect heat of the heating members B and strikes the bars of the grids which breaks up the stream allowing the interpenetrating air which is introduced into the chambers 9 and 13 to pass through the gaps or spaces between grids, and percolate through the material being dried into the discharge chambers 10, 11 and 12 from whence it is drawn by the exhauster 16 carrying with it the moisture in the form of vapor resulting from the drying of the coal. Some of the air tends to short circuit through pockets or voids 32 (see Fig. 9) thus aiding the circulation of the air. The dried coal is then in condition for pulverization or other use.

While coal has been mentioned the apparatus adapts itself for drying various other materials.

I claim:

1. A drier for drying fuel comprising an encasing structure, a fuel inlet and a fuel outlet, heated means forming a conduit through which the fuel is passed and dividing the encasing structure into two chambers, a gas inlet in one of said chambers, a gas outlet in the other chamber and means for setting up a current of gas through the fuel as it is being dried.

2. Apparatus for drying fuel comprising in combination, vertically serially arranged bunker, drier and delivery hopper, means for heating the drier for the indirect drying of the fuel, and means for passing a current of air laterally through the column of material being dried.

3. In drying apparatus the combination of a casing, a drier composed of a stack of vertically spaced grids providing a conduit for the material to be dried, said casing having an inlet and an outlet for the passage of a current of gas therethrough and laterally through the stack of grids.

4. A plurality of hollow heating members arranged to form a conduit for material to be dried, a common source for supplying a heating medium to the heating members, said members being connected to said source of supply for expansion and contraction.

5. A plurality of hollow heating members arranged in stack formation, means for supplying steam to the heating members, and exhaust means, said heating members being arranged to drain the condensates.

6. A multiple drier comprising a casing divided into a plurality of compartments, a heating element in the end compartments dividing said compartments into an inlet and outlet chamber on opposite sides of the heating elements, heating elements in the intermediate compartments dividing said compartments into a common inlet chamber between the elements and an outlet chamber to each side of the elements, and means whereby a current of air flows from the inlet chambers through the heaters to the outlet chambers.

7. A multiple drier comprising a casing divided into a plurality of compartments, a heating element in the end compartments dividing said compartments into an inlet and outlet chamber on opposite sides of the heating element, heating elements in the intermediate compartments dividing said compartments into a common inlet chamber between the elements and an outlet chamber to each side of the elements, a manifold connected to the inlet chambers, a manifold connected to the outlet chambers and means for setting up a flow of air therethrough.

8. In a multiple drier a plurality of heating elements, inlet chambers and outlet chambers for the heating elements, a manifold common to the inlet chambers, a manifold common to the outlet chambers and means for creating a flow of air therethrough.

9. Apparatus for drying fuel comprising a stack of vertically spaced grid members forming a conduit for the fuel to be dried, means for heating the grids, and means for passing a current of gas laterally through the stack of grids.

10. Apparatus for drying fuel comprising a stack of grid members resting one upon the other, supporting ribs extending continuously along each of two opposite sides of each grid and beyond the plane of the bottom of the grid whereby to provide spaces between adjacent grids on the other sides.

11. Drying apparatus comprising a stack of hollow grid members forming a conduit for the material to be dried, means supplying a heating medium and means connecting the grid members to said supply means in groups.

12. Drying apparatus comprising a stack of hollow grid members forming a conduit for the material to be dried, means supplying a heating medium a common exhaust for the grids and means connecting the grids to said exhaust in groups.

13. Drying apparatus comprising a stack of hollow grid members forming a conduit for the material to be dried, and means for circulating a heating medium through the grids, the grids being connected in the circulation in groups.

In testimony whereof, I have hereunto signed my name.

HENRY KREISINGER.